United States Patent
Oh et al.

(10) Patent No.: US 9,432,639 B2
(45) Date of Patent: Aug. 30, 2016

(54) SECURITY VIDEO DETECTION OF PERSONAL DISTRESS AND GESTURE COMMANDS

(75) Inventors: Eric Oh, Syosset, NY (US); David S. Zakrewski, Babylon, NY (US); Mi Suen Lee, Hales Corners, WI (US)

(73) Assignee: HONEYWELL INTERNATIONAL INC., Morristown, NJ (US)

(*) Notice: Subject to any disclaimer, the term of this patent is extended or adjusted under 35 U.S.C. 154(b) by 1341 days.

(21) Appl. No.: 12/950,095

(22) Filed: Nov. 19, 2010

(65) Prior Publication Data

US 2012/0127306 A1 May 24, 2012

(51) Int. Cl.
*H04N 7/18* (2006.01)
*G08B 13/196* (2006.01)

(52) U.S. Cl.
CPC ........ *H04N 7/188* (2013.01); *G08B 13/19613* (2013.01)

(58) Field of Classification Search
USPC .............. 348/143; 702/32; 715/745; 382/115
See application file for complete search history.

(56) References Cited

U.S. PATENT DOCUMENTS

| | | |
|---|---|---|
| 2004/0220753 A1* | 11/2004 | Tabe ................................ 702/32 |
| 2006/0093190 A1* | 5/2006 | Cheng et al. ................. 382/115 |
| 2008/0043101 A1* | 2/2008 | Sharma ............ G08B 13/19643 348/143 |
| 2009/0138805 A1* | 5/2009 | Hildreth ........................ 715/745 |

* cited by examiner

*Primary Examiner* — Jay Patel
*Assistant Examiner* — Francis G Geroleo
(74) *Attorney, Agent, or Firm* — Husch Blackwell LLP

(57) ABSTRACT

A method and apparatus for operating a security system are provided. The method includes the steps of the security system monitoring a secured area, a video camera obtaining images of the secured area, detecting at least one person within the obtained images and identifying a predetermined context associated with the identified at least one person within the obtained images.

18 Claims, 1 Drawing Sheet

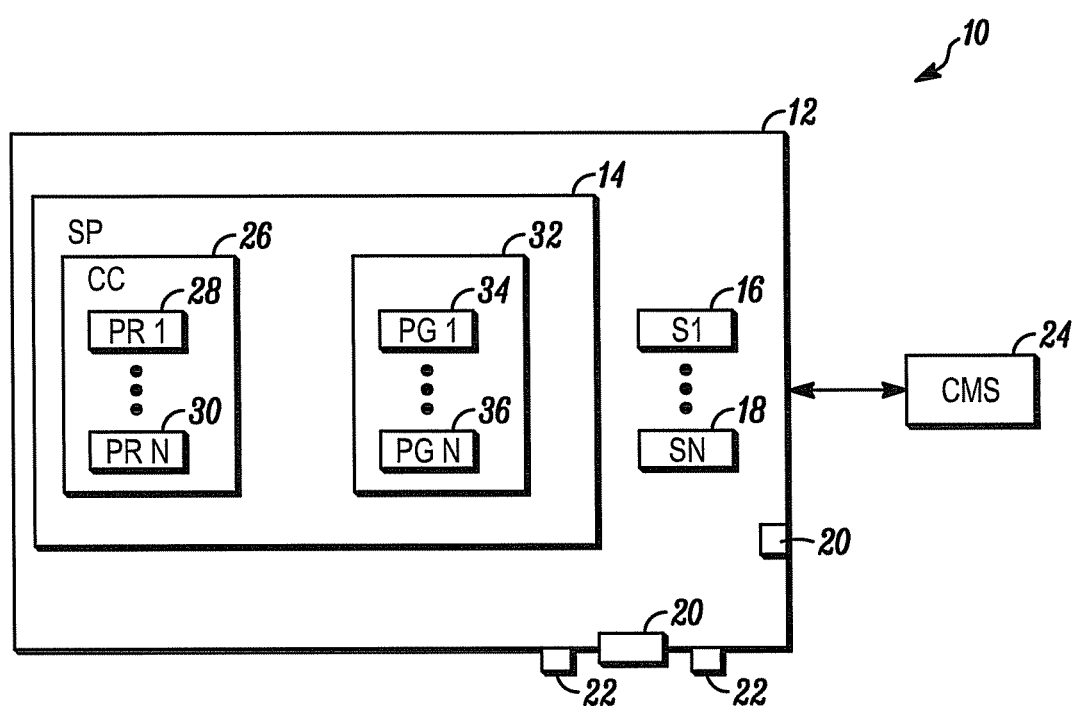

SECURITY VIDEO DETECTION OF PERSONAL DISTRESS AND GESTURE COMMANDS

FIELD OF THE INVENTION

The field of the invention relates to security systems and more particularly to video monitoring in security systems.

BACKGROUND OF THE INVENTION

Security systems are generally known. Such systems typically include some form of physical barrier to intruders, including one or more sensor to detect intruders who are able to surmount the barrier.

In the case of a home, the physical barrier may be the exterior walls of the home. In this case, the sensors may include door sensors that detect the opening or closing of the doors. Window sensors may also be provided to detect intruders who attempt to enter through a window.

The sensors within a home are typically electrical switches that are mechanically connected to a door or window. In other cases, motion detectors may be used that are based upon infrared detection of human intruders or the processing of video signals to detect human shapes.

Security systems typically operate in three modes including disarmed, alarm away and alarm stay. In the disarmed mode, the control panel does not report a burglary alarm when a sensor is activated, while in the alarm away mode the control panel sounds an alarm when a sensor is activated and may report the alarm to a central monitoring station. In the alarm stay (used during night time hours when a homeowner is present), the control panel may only monitor sensors along a periphery of the home.

While alarm systems are effective, authorized users may still be vulnerable to attack when they enter or exit the secured area. Accordingly, a need exists for better ways of protecting users of security systems.

BRIEF DESCRIPTION OF THE DRAWING

FIG. 1 is a block diagram of a security system shown generally in accordance with an illustrated embodiment of the invention.

DETAILED DESCRIPTION OF AN ILLUSTRATED EMBODIMENT

FIG. 1 is a block diagram of a security system 10 shown generally in accordance with an illustrated embodiment of the invention. The security system 10 may include a secured area 12 protected via a security panel 14 and one or more intrusion sensors 16, 18. One or more access points (e.g., doors) 20 may be provided for entry into and egress from the secured area 12.

Included within the control panel 16 may be control circuitry 26 for controlling the security system 10. The control circuitry 26 may include one or more computer processors 28, 30 operating under control of one or more sets of computer program code (programs) 34, 36 executing on the processors 28, 30 or saved in a non-transitory computer readable medium 32.

The secured area 12 may also include a number of video monitoring and collection devices (e.g., cameras) 20, 22. The video devices 20, 22 may be used for real time monitoring by security personnel. Alternatively, a video based, motion detection processor 28, 30 within the security panel 16 may receive video from one of the devices 20, 22 and process the video to detect intruders by detecting changes between successive frames of video.

The security system 10 may operate in one or more modes including an alarm away mode, an alarm stay mode and a disarmed mode. In the alarm away mode, a alarm processor 28, 30 may monitor all of the intrusion sensors 16, 18 and any video based motion detection processors 28, 30 for activation by an intruder. In the alarm stay mode, the alarm processor 28, 30 only monitors sensors 16, 18 around a perimeter of the secured area 12. In response to activation of one of the sensors 16, 18, the alarm processor 28, 30 may compose and send an alarm message to a central monitoring station 24. The central monitoring station may respond by dispatching a private security service or by notifying a local police department.

The security system 10 may be controlled via a keypad and display 22. The keypad and display may be separate devices or may be combined in the form of a touch sensitive display 22. The display 22 may be located outside the secured area 12 as shown in FIG. 1 or may be inside.

In order to activate a particular operating mode within the security system 10, an authorized user may enter an identifying code and then activate a mode selection button on the display 22. For example, the user may enter the number sequence 1, 2, 3, 4 and activate the softkey labeled "ALARM AWAY." In response, the alarm system 10 would enter the alarm away mode.

Included within the alarm system 10 may be one or more human context detection processors 28, 30 that are programmed to detect human presence within a sequence of images from video devices 20, 22 and to analyze video frames associated with that presence to detect specific contexts that require further action. The context detection processors 28, 30 may be particularly useful when used to process video obtained from camera 20, 22 located adjacent the entrance 20 to the secured area 12.

For example, a context detection processor 28, 30 may be programmed to detect the context of duress and to send a silent alarm to the central monitoring station 24 upon detection of that duress. The detection of duress in this case can mean the detection of a specific physical action or the detection and comparison of a specific biometric parameter with a threshold value.

It should be specifically noted that the context detection processor 28, 30 does not operate by detecting locomotion or movement of humans across an image. Instead, the context detection processor 28, 30 detects specific acts performed by or a specific condition of that person. That being said, it should also be noted that those specific acts or conditions could just as well be detected while the person is in motion as well as when the person is stationary and not moving.

As a more specific example, if an authorized user were being threatened by a criminal with a weapon in order to coerce the authorized user to disarm the alarm system 10 in order to allow the criminal access to the secured area 12, the context detection processor 28, 30 may be able to detect that context and to generate a silent alarm. The alarm may be silent in order to not jeopardize the safety of the authorized person.

In general, the context processor 28, 30 may analyze contexts using a number of specific steps and/or modes. These specific steps or modes may be executed by a single processor 28, 30 in sequence or by a number of associated processors 28, 30 programmed to accomplish that step.

For example, a first processor 28, 30 (e.g., a human detection processor) functions to detect human figures within video images. If no human figures are detected within the image, then the first processor simply continues to process frames of video from the video devices 20, 22.

Alternatively, if the human detection processor 28, 30 were to detect first and second human figures, then that processor (or another associated processor 28, 30) may begin to process the outlines of those figures to detect threatening gestures or sounds. A threatening gesture could be an upraised arm.

A threatening sound may be detected by a microphone associated with the video device 20, 22. In this case, a sound processor 28, 30 may first filter sound to isolate those portions of the sound associated with a particular threat. One such threat could be loud voices. Another threatening sound may be gunfire.

In general, the gestures or sounds may be associated with a threshold level defined by the context. In the case of voices, the threshold level may be set to that of a loud voice or shouting. In the case of a gesture such as an upraised arm, the threshold may be associated with the speed with which the arm was raised and/or the speed of any downward motion that follows raising the arm.

In addition, the gestures and sounds may be logically ANDed with or supplanted by other contexts or context parameters. One context parameter is the detection of a weapon. In this regard, a processor (e.g., a weapons processor) 28, 30 may identify the distal end of a human figure's arm and process the distal end for any unusual image details that could be construed as a weapon. In this regard, the detection of a gun is relatively straightforward. On the other hand, the detection of a rock held in the hand of a criminal would be less conclusive. In this case, a threat factor or value may be assigned to this image detail that is added to other threat factors or values (e.g., loud voices, speed of arm movement, etc.). A threshold value may be used in conjunction with the summation of threat factors or values.

Another context parameter may be biometric. In one example, the video devices 20, 22 may collect heat signatures of portions of the human figures (e.g., the face). The heat signature of the face may be compared with a threshold value to again determine if the threat factor exceeds an associated threshold value.

Another processor 28, 30 (e.g., a face recognition processor) may be programmed to compare a face portion of detected human figures with templates of authorized users to recognize an authorized user from within a group of two or more human figures. In this case, the heat signature of a recognized authorized user may be taken as a sign of duress where the heat signature exceeds a threshold value for that user.

Another processor 28, 30 (e.g., a gesture processor) may be programmed to identify predefined actions by authorized users that have already been (or concurrently) identified by the face recognition processor 28, 30. In this case, an authorized user may preprogram or define certain overt gestures as a sign of duress. For example, the act of an authorized user placing the palm of his/her hand over their face with fingers spread and holding their hand there for some predefined period while that person approaches the entrance 20 may be a predetermined gesture of duress.

Alternatively, repetitive acts may be a predefined indicator of duress. For example, the authorized user placing his/her forefinger to his/her nose twice in a predefined period may be one of the predefined indicators of duress.

As a still further alternative, predefined actions by an authorized user may be used to execute certain processes by the alarm system 10 as a convenience to the authorized user or to defuse a situation where the authorized user feels threatened. For example, if the authorized user is approached by a stranger while attempting to enter the secured area 12, the authorized user may perform the predefined action in order to cause the security system 10 to perform the process associated with that predefined act. The process performed in response to the predefined act may be for the system 10 to provide an audio announcement through a speaker located adjacent the entrance 20 that the security system 10 is armed. Alternatively, the process may involve the security system 10 announcing that a video recording is being made of all actions at that location. In this case, the announcement may operate as a deterrent to the approaching stranger intent on performing some criminal act.

As a still further alternative, a processor 28, 30 (e.g., a fight detection processor) may be programmed to detect a fight between two detected humans. In this case, the momentary merging of the detected human figures and speed of motion of the appendages of the detected human figures may cause the fight detection processor to detect a fight and then compose and send an alarm message to the central monitoring station announcing the fight. This may be a lower level alarm message since it is outside the secured area 12 unless one of the figures can be identified as an authorized user. If one of the participants is an authorized user, then a higher level alarm is sent since this may be a criminal assault on the authorized user or an attempt to gain access to the secured area 12.

A specific embodiment of a method and apparatus for detecting intruders has been described for the purpose of illustrating the manner in which the invention is made and used. It should be understood that the implementation of other variations and modifications of the invention and its various aspects will be apparent to one skilled in the art, and that the invention is not limited by the specific embodiments described. Therefore, it is contemplated to cover the present invention and any and all modifications, variations, or equivalents that fall within the true spirit and scope of the basic underlying principles disclosed and claimed herein.

The invention claimed is:

1. A method comprising:
    a security system monitoring a secured area;
    a video camera obtaining images of the secured area;
    detecting at least one authorized person and at least one other person within the obtained images;
    analyzing video frames of the obtained images for specific contexts involving the detected at least one authorized person or at least one other person that require further action, wherein the analyzing does not operate by detecting locomotion or movement of humans across one of the obtained images and, instead, the analyzing operates to detect specific acts performed by or a specific condition of the detected at least one authorized person or at least one other person; and
    identifying a predetermined context associated with the detected at least one authorized person or at least one other person within the analyzed video frames requiring further action of the obtained images.

2. The method as in claim 1 wherein the step of identifying the predetermined context further comprises detecting a hand gesture.

3. The method as in claim 1 wherein the step of identifying the predetermined context further comprises detecting a predetermined interaction between the detected at least one authorized person and at least one other person within the obtained images.

4. The method as in claim 3 further comprising defining the predetermined interaction as a display of a weapon by one of the detected at least one authorized person and at least one other person.

5. The method as in claim 3 further comprising defining the predetermined interaction as a fight between the detected at least one authorized person and at least one other person.

6. The method as in claim 1 wherein the step of identifying the predefined context further comprises measuring a biometric parameter of the detected at least one authorized person.

7. The method as in claim 6 wherein the biometric parameter further comprises a heat signature of the identified-detected at least one authorized person.

8. The method as in claim 1 further comprising triggering a silent alarm of the security system upon identifying the predetermined context.

9. The method as in claim 1 further comprising providing an audio status report of the security system to the detected at least one authorized person upon identifying the predetermined context.

10. An apparatus comprising:
means for monitoring a secured area;
means for obtaining a sequence of images of the secured area;
means for identifying at least one authorized person and at least one other person within the obtained sequence of images;
a context detection processor that analyzes video frames of the obtained sequence of images for specific contexts involving the identified at least one authorized person or at least one other person that require, further action, wherein the context detection processor does not operate by detecting locomotion or movement of humans across one of the obtained sequence of images and, instead, the context detection processor operates to detect specific acts performed by or a specific condition of the identified at least one authorized person or at least one other person; and
means for detecting a predetermined action performed by or associated with the identified at least one authorized person or at least one other person within the analyzed video frames requiring further action of the obtained sequence of images.

11. The apparatus as in claim 10 wherein the predetermined action further comprises a display of a weapon by one of the identified at least one authorized person and at least one other person.

12. The apparatus as in claim 10 wherein the predetermined action further comprises a fight between the identified at least one authorized person and at least one other person.

13. The apparatus as in claim 10 wherein the predetermined action further comprises a measured biometric parameter of the identified at least one authorized person.

14. The apparatus as in claim 13 wherein the biometric parameter further comprises a heat signature of the identified at least one authorized person.

15. An apparatus comprising:
a security system that monitors a secured area;
a video camera that obtains images proximate the secured area;
a programmed processor that identifies at least one authorized person and at least one other person within the obtained images;
a context detection processor that analyzes video frames of the obtained images for specific contexts involving the identified at least one authorized person or at least one other person that require further action, wherein the context detection processor does not operate by detecting locomotion or movement of humans across one of the obtained images and, instead, the context detection processor operates to detect specific acts performed by or a specific condition of the identified at least one authorized person or at least one other person;
a programmed processor that detects a predetermined context associated with the identified at least one authorized person or at least one other person within the analyzed video frames requiring further action of the obtained images; and
a programmed processor that performs a predefined action in response to the detected predetermined context.

16. The apparatus as in claim 15 wherein the predetermined context further comprises a hand gesture.

17. The apparatus as in claim 16 further comprising a programmed processor that sends an alarm message to a central monitoring station in response to the predetermined context.

18. The apparatus as in claim 15 further comprising a programmed processor that provides an audio status report of the security system to the identified at least one authorized person upon detecting the predetermined context.

* * * * *